(12) United States Patent
Moriyama et al.

(10) Patent No.: US 7,271,808 B2
(45) Date of Patent: Sep. 18, 2007

(54) IMAGE DISPLAY CONTROL METHOD AND IMAGE DISPLAY CONTROL APPARATUS

(75) Inventors: Seiichi Moriyama, Nagaokakyo (JP); Naoto Osaka, Kusatsu (JP); Takashi Koizumi, Kusatsu (JP); Hiroyuki Kageyama, Takatsuki (JP); Hiroyuki Morinaga, Osaka (JP); Noriko Kaku, Kyoto (JP); Yumiko Kataoka, Joyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 644 days.

(21) Appl. No.: 10/833,287

(22) Filed: Apr. 28, 2004

(65) Prior Publication Data

US 2004/0217963 A1 Nov. 4, 2004

(30) Foreign Application Priority Data

May 1, 2003 (JP) .............................. 2003-126382

(51) Int. Cl.
*G06F 12/02* (2006.01)
*G06F 15/167* (2006.01)
*G09G 3/36* (2006.01)

(52) U.S. Cl. ........................... 345/543; 345/87; 345/98; 345/99; 345/100; 345/530; 345/531; 345/533; 345/539; 345/541

(58) Field of Classification Search .................. 345/87, 345/98, 99, 100, 530–574
See application file for complete search history.

(56) References Cited

U.S. PATENT DOCUMENTS 4,485,378 A 11/1984 Matsui et al.
5,179,692 A 1/1993 Inoue
5,396,343 A * 3/1995 Hanselman .................. 345/555
6,222,518 B1 * 4/2001 Ikeda et al. .................... 345/98
6,674,423 B2 1/2004 Isozaki
6,720,968 B1 * 4/2004 Butler et al. ................ 345/535
7,154,490 B2 * 12/2006 Yoneyama ................... 345/204

FOREIGN PATENT DOCUMENTS

JP 10105505 4/1998
WO 0003381 1/2000

* cited by examiner

*Primary Examiner*—Richard Hjerpe
*Assistant Examiner*—My-Chau T. Tran
(74) *Attorney, Agent, or Firm*—Stevens, Davis, Miller & Mosher, LLP

(57) ABSTRACT

When a contention is detected between a memory write address and a display read address in a memory circuit which stores display data, a host retry pulse generating circuit generates a display read signal and a display line data transfer signal based on a memory write clock, and supplies these to the memory circuit while supplying the display line data transfer signal to a line latch circuit. Alternatively, upon detection of the contention above, a same line re-display read processing circuit performs same line re-display read processing without moving to the next line, and supplies a display read signal and a display line data transfer signal to the memory circuit while supplying the display line data transfer signal to the line latch circuit.

17 Claims, 7 Drawing Sheets

IMAGE DISPLAY CONTROL METHOD AND IMAGE DISPLAY CONTROL APPARATUS

BACKGROUND OF THE INVENTION

1. Field of the Invention

The present invention relates to an image display control method for use in a liquid crystal display apparatus, a plasma display apparatus, an EL (electro-luminescence) display apparatus and the like to display images, and to an image display control apparatus.

2. Prior Art

As conventional techniques regarding an image display control method and an image display control apparatus, a liquid crystal display control method and a liquid crystal display control apparatus will now be described.

FIG. 4 is a schematic block diagram of a conventional liquid crystal display control apparatus as it handles a liquid crystal display (image display) request and a host computer access request. In FIG. 4, denoted at 401 is a host computer, namely, a micro computer unit. Denoted at 402 is a host interface circuit. Denoted at 403 is a memory circuit which stores display data. Denoted at 404 is a line latch circuit which stores one horizontal line-equivalent display data which is used to realize liquid crystal display (image display). Denoted at 405 is a memory select address location which is in response to a host access. Denoted at 406 is a memory line select address location which is in response to an LCD display read access. Denoted at 407 is a display line data transfer signal for an LCD display read access.

As the host computer 401 accesses in order to write display data, pixel data is written at the memory address select location 405 which corresponds to a vertical-direction and a horizontal-direction addresses within the memory circuit 403. Meanwhile, since display data one horizontal line equivalent to needs be transferred to the line latch circuit 404 to realize liquid crystal display (image display), a vertical address corresponding to one horizontal line is selected from among addresses within the memory circuit 403 in accordance with the memory line select address location 406 which is in response to the LCD display read access. The data representing thus selected line is sent to the line latch circuit 404 based on the display line data transfer signal 407.

An access request to the memory circuit 403 from the host computer 401 is in an asynchronous relationship with an access request to the memory circuit 403 from the liquid crystal display apparatus. Hence, while the host computer 401 and the liquid crystal display apparatus both access, the same data address could be selected.

FIG. 5 is a schematic diagram showing an example of a 1-bit structure within a memory circuit and a relationship with a line latch circuit. In FIG. 5, denoted at 501 is a 1-bit memory. Denoted at 502 is an initialization circuit. Denoted at 503 is a line latch circuit. Denoted at 504 is a line select signal. Denoted at 505 is a memory output. Denoted at 506 is an output from the initialization circuit 502. Denoted at 507 is a display read bus.

The 1-bit memory 501 within the memory circuit is formed by a P-channel or N-channel transistor for a small size. Within the memory circuit, a display read operation for a line selected by the line select signal 504 is as follows. That is, the display read bus 507 is initialized in response to the initialization output 506 from the initialization circuit 502, the memory output 505 from the 1-bit memory 501 is then outputted to the display read bus 507, and the line latch circuit 503 receives OR of the initialization output 506 and the memory output 505. When a P-channel transistor is used for example, the memory output 505, namely, read data is in a high-level state or high-impedance state, and therefore, the initialization circuit 502 reads the L-level.

FIGS. 6 and 7 are timing charts which show an example that there is no contention between an access request from the host computer and an access request for liquid crystal display (image display) and an example that there is such a contention.

Shown in FIG. 6 is a normal state that there is no contention between a host computer access and a display read access. In FIG. 6, a high-level pulse T611 occurs in a display read signal 611, at which time a value T612 (00_1111) of memory data 612 changes to a value T613 (00_1111) of a display read data output 613 from the memory circuit. Meanwhile, the pulse T611 of the display read signal 611 makes the initialization circuit execute initialization, and the state of a display read bus 614 therefore becomes an initialized state T614.

After this, because of the value T613 of the display read data output 613, the state of the display read bus 614 becomes a value T615 (00_1111). As a high-level pulse T616 occurs in a display line data transfer signal 616, a line latch output 617 becomes a value T617 (00_1111).

FIG. 7 shows a state that there arises a contention between a host computer access and a display read access. As shown in FIG. 7, a high-level pulse T621 occurs in a display read signal 621, at which time a value T622 (00_1111) of memory data 622 changes to a value T623 (00_1111) of a display read data output 623 from the memory circuit. Meanwhile, the pulse T621 of the display read signal 621 makes the initialization circuit execute initialization, and the state of a display read bus 624 therefore becomes an initialized state T624.

After this, because of the value T623 of the display read data output 623, the state of the display read bus 624 becomes a value T625 (00_1111).

When the memory data 622 changes to a value T626 (00_1111) owing to a host computer access during a contending data display period T631 which is influenced by the access contention, the display read data output 623 from the memory circuit becomes a value T627 (00_1111). In consequence, the state of a display read bus 624 undesirably becomes a value T628 (11_1111) which is OR of the value T625 (00_1111) and the value T627 (00_1111). As a high-level pulse T629 occurs in a display line data transfer signal 629, a line latch output 630 undesirably becomes a value T630 (11_1111) which is influenced by the access contention.

The following may be a method of avoiding an access contention in a situation that an access to the memory circuit from the host computer is in an asynchronous relationship with a display read access to the memory circuit from the liquid crystal display apparatus. In other words, when the host computer sends an access request while the liquid crystal display apparatus sends an LCD access request, an arbitration circuit may provide arbitration and RAM accessing responding to either one of the access requests may be initiated. At this stage, the arbitration circuit permits initiation of accessing under a condition that pre-charging of the RAM has finished. When there is a contention between a host access request and an LCD access request, the host access request is always given a priority (See PCT Publication in Japan 2000-003381 (page 1, FIG. 2).). The arbitration circuit may be the one described in Japanese Patent Application Laid-Open Gazette No. H10-105505 (pages 6 to 8, FIG. 5), for instance.

However, during the arbitration in the conventional structure described above, when a display read access from the liquid crystal display apparatus is earlier than a write access from the host computer for example, displaying will be provided before the arbitration circuit stops display read. There thus remains a problem that the contending data will be displayed.

In addition, when a contention with a host access arises once again upon resumption of an LCD access in response to an operation of the arbitration circuit, the arbitration will continue. This is a problem that displaying will not be provided indefinitely or that the complex arbitration circuit gives rise to malfunction.

SUMMARY OF THE INVENTION

An object of the present invention is to provide an image display control method and an image display control apparatus with which it is possible to prevent displaying of wrong data on a screen owing to a contention between a write access from a host computer and a display read access from an image display apparatus.

The image display control method and the image display control apparatus according to the present invention determine that a period of time which is influenced by a contention is an access contention monitoring period and require that upon detection of a contention during this period, a display read signal and a display line data transfer signal are generated as a pair at the stage of writing in a memory circuit. This makes it possible to always transfer the most recent information of a memory to a line latch circuit so that the information will be displayed.

As another means, a period of time which is influenced by a contention is regarded as an access contention monitoring period, and when a contention is detected during this period, same line re-display read processing is executed immediately after the detection of the contention. This makes wrong display data overwritten as a result of the re-display processing every time a contention occurs, and hence, the contending display data are made invisible.

An image display control method according to the first invention requires that display data written in a memory circuit (120) is read in the units of lines and held in a line latch circuit (121), the display data is supplied in the units of lines to an image display apparatus from the line latch circuit (121) and the image display apparatus accordingly displays an image. At this stage, an access contention for the same address in the memory circuit (120) is to be detected which occurs between writing to update the display data and reading of the display data to display an image. In the event that an access contention is detected, a display read signal and a display line data transfer signal are generated based on a memory write clock, and the display read signal and the display line data transfer signal are supplied to the memory circuit (120) while supplying the display line data transfer signal to the line latch circuit (121) which holds, in the units of lines, data which has been read out from the memory circuit (120). In consequence, the display data representing the line for which the access contention has occurred is read out from the memory circuit (120) and transferred to the line latch circuit (121).

In accordance with this method, when an access contention to the same address within the memory circuit (120) is detected between writing for updating of display data and reading of display data for displaying of an image, that is, when a contention is detected between a memory write address and a display read address in the memory circuit (120), the display read signal and the display line data transfer signal are generated based on the memory write clock, the display read signal and the display line data transfer signal are then fed to the memory circuit (120) while supplying the display line data transfer signal also to the line latch circuit (121). The display data is therefore read out from the memory circuit (120) as for the access contention-bearing line and transferred to the line latch circuit (121). This prevents displaying of wrong data on a screen which would be otherwise caused by the contention between the write access from the host computer and the display read access from the image display apparatus.

In the image display control method according to the first invention, it is preferable that the display read signal and the display line data transfer signal are generated as a pair based on the memory write clock and outputted to the memory circuit (120) for every contention, and at the time of writing of display data in the memory circuit (120), the latest updated data is always re-transferred to the line latch circuit (121).

When this method is used, it is possible to more securely prevent displaying of wrong data on a screen attributed to the contention between the write access from the host computer and the display read access from the image display apparatus.

An image display control method according to the second invention requires that display data written in a memory circuit (120) is read in the units of lines and held in a line latch circuit (121), the display data is supplied in the units of lines to an image display apparatus from the line latch circuit (121) and the image display apparatus accordingly displays an image. At this stage, an access contention for the same address in the memory circuit (120) is to be detected which occurs between writing to update the display data and reading of the display data to display an image. In the event that an access contention is detected, a display read signal and a display line data transfer signal are generated for execution of same line re-display read processing, and the display read signal and the display line data transfer signal are supplied to the memory circuit (120) while supplying the display line data transfer signal to the line latch circuit (121) which holds, in the units of lines, data which has been read out from the memory circuit (120). In consequence, the line for which the access contention has occurred is re-displayed.

In accordance with this method, when an access contention to the same address within the memory circuit (120) is detected between writing for updating of display data and reading of display data for displaying of an image, that is, when a contention is detected between a memory write address and a display read address in the memory circuit (120), the display read signal and the display line data transfer signal are generated for execution of the same line re-display read processing without moving to the next line, the display read signal and the display line data transfer signal are then fed to the memory circuit (120) while supplying the display line data transfer signal also to the line latch circuit (121) in which data read out from the memory circuit (120) are held line by line. The line for which the contention has occurred is thus re-displayed. This prevents displaying of wrong data on a screen which would be otherwise caused by the contention between the write access from the host computer and the display read access from the image display apparatus.

In the image display control method of the second invention, it is preferable that the same line is re-displayed speedily upon occurrence of a contention, and therefore, without displaying wrong data because of the access contention, the latest data held in the memory circuit (120) is re-transferred to the line latch circuit (121) and the latest data as it is after the contention has been resolved is displayed.

By means of this method, it is possible to more securely prevent displaying of wrong data on a screen attributed to the contention between the write access from the host computer and the display read access from the image display apparatus.

In the image display control method above, the number of times for re-displaying the same line can be freely set.

When this method is used, it is possible to execute the re-display processing indefinitely, or alternatively, by setting the number of times and accordingly limiting the re-display processing to a certain range which will maintain a display quality, it is possible to suppress a drop of the frame frequency of a display image.

Because of the re-display processing, this line is extended in terms of time to normal one-line display time+α (i.e., the time before proceeding to re-displaying). Since a contention could possibly arise again for every re-display processing, if the re-display processing lasts long, the same line will be displayed indefinitely and the display image will remain as a still image indefinitely. The number of times mentioned above is set so as to avoid this, and the number of times may be set within the range which will maintain a display quality.

In the image display control method of the second invention, it is preferable that the same line is re-displayed so that the phase relationship is forced to shift between the cycles of display data transfer to the memory circuit (120) and the cycles of a display read access to the memory circuit (120) and that the frequency of later access contentions for the same address is accordingly reduced.

An image display control apparatus according to the third invention comprises: a host computer (101);

a host interface circuit (102) which transfers display data with the host computer (101);

a memory address counter circuit (103) which receives a write address from the host interface circuit (102) and increments or decrements the address;

a register setting circuit (104) which receives a register write address and register write data from the host interface circuit (102);

a display read clock signal generating circuit (105) which generates a display read clock signal which serves as a reference clock for displaying;

a horizontal-direction counter circuit (106) for display which counts the display read clock signal which is outputted from the display read clock signal generating circuit (105);

a horizontal-counter decode circuit (107) which decodes an output signal of the horizontal-direction counter circuit for display (106) and outputs a first display read signal and a first display line data transfer signal;

a vertical-direction counter circuit for display (108) which receives a predetermined output value of the horizontal-direction counter circuit for display (106) and increments or decrements;

a counter decode circuit (109) which decodes an output from the vertical-direction counter circuit for display (108) and an output from the memory address counter circuit (103) and outputs a memory write address and a display read address;

an address coincidence detect circuit (110) which receives the memory write address and the display read address which are outputted from the counter decode circuit (109) and determines whether the memory write address and the display read address coincide with each other;

an access contention monitoring period pulse generating circuit (111) which generates a pulse which defines an access contention monitoring period, based on the outputs from the horizontal-counter decode circuit (107);

an address contention judging circuit (112) which determines whether there is a contention between the display read address and the memory write address in accordance with an output from the address coincidence detect circuit (110) and an output from the access contention monitoring period pulse generating circuit (111);

a host retry pulse generating circuit (113) which receives the memory write clock from the host interface circuit (102) and an output from the address contention judging circuit (112), and during the access contention monitoring period, as an access contention arises, generates a second display read signal and a second display line data transfer signal based on the memory write clock;

a normal read processing circuit (115) which generates a third display read signal and a third display line data transfer signal which are for execution of normal display read processing, in accordance with the first display read signal and the first display line data transfer signal outputted from the horizontal-counter decode circuit (107) and the output from the vertical-direction counter circuit for display (108);

a retry display read selection circuit (118) which selectively outputs, in accordance with an output from the register setting circuit (104), either one of the second display read signal outputted from the host retry pulse generating circuit (113) and the third display read signal outputted from the normal read processing circuit (115);

a retry line data transfer selection circuit (119) which selectively outputs, in accordance with an output from the register setting circuit (104), either one of the second display line data transfer signal outputted from the host retry pulse generating circuit (113) and the third display line data transfer signal outputted from the normal read processing circuit (115);

a memory circuit (120) which receives an output from the host interface circuit (102), an output from the memory address counter circuit (103), an output from the vertical-direction counter circuit for display (108), an output from the retry display read selection circuit (118) and an output from the retry line data transfer selection circuit (119), and stores display data which a image display apparatus is to display;

and a line latch circuit (121) which receives an output from the memory circuit (120) and the output from the retry line data transfer selection circuit (119), holds the output from the memory circuit (120) in the units of lines, and supplies an output to the image display apparatus.

This structure comprises the address coincidence detect circuit (110), the access contention monitoring period pulse generating circuit (111), the address contention judging circuit (112) and the host retry pulse generating circuit (113). When a contention arises between a memory write address and a display read address in the memory circuit (120), that is, when an access contention to the same address within the memory circuit (120) is detected between writing for updating of display data and reading of display data for displaying of an image, the second display read signal and the second display line data transfer signal are generated based on the memory write clock, the second display read signal and the second display line data transfer signal are then fed to the memory circuit (120) while supplying the second display line data transfer signal also to the line latch circuit (121) in which data read out from the memory circuit (120) are held line by line. This makes it possible to read display data representing the access contention-bearing line out from the memory circuit (120) and transfer the display data to the line latch circuit (121). As a result, it is possible to prevent displaying of wrong data on a screen which would be otherwise caused by the contention between the write access from the host computer and the display read access from the image display apparatus.

An image display control apparatus of the fourth invention comprises: a host computer (101);

a host interface circuit (102) which transfers display data with the host computer (101);

a memory address counter circuit (103) which receives a write address from the host interface circuit (102) and increments or decrements the address;

a register setting circuit (104) which receives a register write address and register write data from the host interface circuit (102);

a display read clock signal generating circuit (105) which generates a display read clock signal which serves as a reference clock for displaying;

a horizontal-direction counter circuit for display (106) which counts the display read clock signal which is outputted from the display read clock signal generating circuit (105);

a horizontal-counter decode circuit (107) which decodes an output signal of the horizontal-direction counter circuit for display (106) and outputs a first display read signal and a first display line data transfer signal;

a vertical-direction counter circuit for display (108) which receives a predetermined output value of the horizontal-direction counter circuit for display (106) and increments or decrements;

a counter decode circuit (109) which decodes an output from the vertical-direction counter circuit for display (108) and an output from the memory address counter circuit (103) and outputs a memory write address and a display read address;

an address coincidence detect circuit (110) which receives the memory write address and the display read address which are outputted from the counter decode circuit (109) and determines whether the memory write address and the display read address coincide with each other;

an access contention monitoring period pulse generating circuit (111) which generates a pulse which defines an access contention monitoring period, based on the outputs from the horizontal-counter decode circuit (107);

an address contention judging circuit (112) which determines whether there is a contention between the display read address and the memory write address in accordance with an output from the address coincidence detect circuit (110) and an output from the access contention monitoring period pulse generating circuit (111);

a same line re-display read processing circuit (114) which receives the first display read signal and the first display line data transfer signal outputted from the horizontal-counter decode circuit (107) and an output from the address contention judging circuit (112), and generates a second display read signal and a second display line data transfer signal which are for execution of same line re-display read processing, without moving to the next line as a contention arises during the access contention monitoring period;

a normal read processing circuit (115) which generates a third display read signal and a third display line data transfer signal which are for execution of normal display read processing, in accordance with the first display read signal and the first display line data transfer signal outputted from the horizontal-counter decode circuit (107) and the output from the vertical-direction counter circuit for display (108);

a retry display read selection circuit (118) which selectively outputs, in accordance with an output from the register setting circuit (104), either one of the second display read signal outputted from the same line re-display read processing circuit (114) and the third display read signal outputted from the normal read processing circuit (115);

a retry line data transfer selection circuit (119) which selectively outputs, in accordance with an output from the register setting circuit (104), either one of the second display line data transfer signal outputted from the same line re-display read processing circuit (114)and the third display line data transfer signal outputted from the normal read processing circuit (115);

a memory circuit (120) which receives an output from the host interface circuit (102), an output from the memory address counter circuit (103), an output from the vertical-direction counter circuit for display (108), an output from the retry display read selection circuit (118) and an output from the retry line data transfer selection circuit (119), and stores display data which a image display apparatus is to display; and a line latch circuit (121) which receives an output from the memory circuit (120) and the output from the retry line data transfer selection circuit (119), holds the output from the memory circuit (120) in the units of lines, and supplies an output to the image display apparatus.

This structure comprises the address coincidence detect circuit (110), the access contention monitoring period pulse generating circuit (111), the address contention judging circuit (112) and the same line re-display read processing circuit (114). When a contention arises between a memory write address and a display read address in the memory circuit (120), that is, when an access contention to the same address within the memory circuit (120) is detected between writing for updating of display data and reading of display data for displaying of an image, the second display read signal and the second display line data transfer signal are generated for execution of the same line re-display read processing without moving to the next line, the second display read signal and the second display line data transfer signal are then fed to the memory circuit (120) while supplying the second display line data transfer signal also to the line latch circuit (121) in which data read out from the memory circuit (120) are held line by line. The line for which the contention has occurred is thus re-displayed. This prevents displaying of wrong data on a screen which would be otherwise caused by the contention between the write access from the host computer and the display read access from the image display apparatus.

An image display control apparatus of the fifth invention comprises: a host computer (101);

a host interface circuit (102) which transfers display data with the host computer (101);

a memory address counter circuit (103) which receives a write address from the host interface circuit (102) and increments or decrements the address;

a register setting circuit (104) which receives a register write address and register write data from the host interface circuit (102);

a display read clock signal generating circuit (105) which generates a display read clock signal which serves as a reference clock for displaying;

a horizontal-direction counter circuit (106) for display which counts the display read clock signal which is outputted from the display read clock signal generating circuit (105);

a horizontal-counter decode circuit (107) which decodes an output signal of the horizontal-direction counter circuit for display (106) and outputs a first display read signal and a first display line data transfer signal;

a vertical-direction counter circuit for display (108) which receives a predetermined output value of the horizontal-direction counter circuit for display (106) and increments or decrements;

a counter decode circuit (109) which decodes an output from the vertical-direction counter circuit for display (108) and an output from the memory address counter circuit (103) and outputs a memory write address and a display read address;

an address coincidence detect circuit (110) which receives the memory write address and the display read address which are outputted from the counter decode circuit (109) and determines whether the memory write address and the display read address coincide with each other;

an access contention monitoring period pulse generating circuit (111) which generates a pulse which defines an access contention monitoring period, based on the outputs from the horizontal-counter decode circuit (107);

an address contention judging circuit (112) which determines whether there is a contention between the display read address and the memory write address in accordance with an output from the address coincidence detect circuit (110) and an output from the access contention monitoring period pulse generating circuit (111);

a host retry pulse generating circuit (113) which receives the memory write clock from the host interface circuit (102) and an output from the address contention judging circuit (112), and during the access contention monitoring period, as an access contention arises, generates a second display read signal and a second display line data transfer signal based on the memory write clock;

a same line re-display read processing circuit (114) which receives the first display read signal and the first display line data transfer signal outputted from the horizontal-counter decode circuit (107) and an output from the address contention judging circuit (112), and generates a third display read signal and a third display line data transfer signal which are for execution of same line re-display read processing, without moving to the next line as a contention arises during the access contention monitoring period;

a normal read processing circuit (115) which generates a fourth display read signal and a fourth display line data transfer signal which are for execution of normal display read processing, in accordance with the first display read signal and the first display line data transfer signal outputted from the horizontal-counter decode circuit (107) and the output from the vertical-direction counter circuit for display (108);

a display read selection circuit (116) which selects, in accordance with an output from the register setting circuit (104), either a state that of the second display read signal outputted from the host retry pulse generating circuit (113) and the third display read signal outputted from the same line re-display read processing circuit (114), only the second display read signal outputted from the host retry pulse generating circuit (113) is outputted, a state that the third display read signal outputted from the same line re-display read processing circuit (114) alone out of these is outputted, or a state that both the second display read signal outputted from the host retry pulse generating circuit (113) and the third display read signal outputted from the same line re-display read processing circuit (114) are made valid and outputted, and which outputs this as a fifth display read signal;

a line data transfer selection circuit (117) which selects, in accordance with an output from the register setting circuit (104), either a state that of the second display line data transfer signal outputted from the host retry pulse generating circuit (113) and the third display line data transfer signal outputted from the same line re-display read processing circuit (114), only the second display line data transfer signal outputted from the host retry pulse generating circuit (113) is outputted, a state that the third display line data transfer signal outputted from the same line re-display read processing circuit (114) alone out of these is outputted, or a state that both the second display line data transfer signal outputted from the host retry pulse generating circuit (113) and the third display line data transfer signal outputted from the same line re-display read processing circuit (114) are made valid and outputted, and which outputs this as a fifth display line data transfer signal;

a retry display read selection circuit (118) which selectively outputs either one of the fifth display read signal outputted from the display read selection circuit (116) and the fourth display read signal outputted from the normal read processing circuit (115), in accordance with an output from the register setting circuit (104);

a retry line data transfer selection circuit (119) which selectively outputs, in accordance with an output from the register setting circuit (104), either one of the fifth display line data transfer signal outputted from the line data transfer selection circuit (117) and the fourth display line data transfer signal outputted from the normal read processing circuit (115);

a memory circuit (120) which receives an output from the host interface circuit (102), an output from the memory address counter circuit (103), an output from the vertical-direction counter circuit for display (108), an output from the retry display read selection circuit (118) and an output from the retry line data transfer selection circuit (119), and stores display data which a image display apparatus is to display; and a line latch circuit (121) which receives an output from the memory circuit (120) and the output from the retry line data transfer selection circuit (119), holds the output from the memory circuit (120) in the units of lines, and supplies an output to the image display apparatus.

This structure comprises the address coincidence detect circuit (110), the access contention monitoring period pulse generating circuit (111), the address contention judging circuit (112), the host retry pulse generating circuit (113) and the same line re-display read processing circuit (114). When a contention arises between a memory write address and a display read address in the memory circuit (120), that is, when an access contention to the same address within the memory circuit (120) is detected between writing for updating of display data and reading of display data for displaying of an image, the second display read signal and the second display line data transfer signal are generated based on the memory write clock, the second display read signal and the second display line data transfer signal are then fed to the memory circuit (120) while supplying the second display line data transfer signal also to the line latch circuit (121) in which data read out from the memory circuit (120) are held line by line. Alternatively, the third display read signal and the third display line data transfer signal are generated for execution of the same line re-display read processing without moving to the next line, the third display read signal and the third display line data transfer signal are then fed to the memory circuit (120) while supplying the third display line data transfer signal also to the line latch circuit (121) in which data read out from the memory circuit (120) are held line by line. This makes it possible to read display data representing the access contention-bearing line out from the memory circuit (120) and transfer the display data to the line latch circuit (121), or the line for which the contention has occurred is thus re-displayed. This prevents displaying of wrong data on a screen which would be otherwise caused by the contention between the write access from the host computer (101) and the display read access from the image display apparatus.

In the image display control apparatus of the third or the fifth invention, it is preferable that at the time that a contention is judged based on the output from the address contention judging circuit (112), the host retry pulse generating circuit (113) generates the second display read signal and the second display line data transfer signal as a pair for every contention and outputs these to the memory circuit (120), so that the latest updated data is always re-transferred to the line latch circuit (121) during writing of display data in the memory circuit (120).

In this structure, during judgment of the contention based on the output from the address contention judging circuit (112), for every contention, the host retry pulse generating circuit (113) generates the display read signal and the display line data transfer signal as a pair and outputs these to the memory circuit (120), and the latest data is always re-transferred to the line latch circuit (121) while the display data are being written in the memory circuit (120). Hence, it is possible to more securely prevent displaying of wrong data because of the access contention.

In the image display control apparatus of the fourth or the fifth invention, it is preferable that at the time that a contention is judged based on the output from the address contention judging circuit (112), the same line re-display read processing circuit (114) speedily performs re-display processing of the same line, and therefore, without displaying wrong data because of a contention between an access from the host computer and an access from the display read side, the latest data held in the memory circuit (120) is re-transferred to the line latch circuit (121) and the latest data as it is after the contention has been resolved is displayed.

In this structure, during judgment of the contention based on the output from the address contention judging circuit (112), the same line re-display read processing circuit (114) speedily performs the re-display processing of the same line, the latest data held in the memory circuit (120) is re-transferred to the line latch circuit (121), and the most recent post-contention data is displayed. Hence, it is possible to more securely prevent displaying of wrong data owing to the contention between the access from the host computer and the access from the display read side.

In the image display control apparatus of the fourth or the fifth invention, it is preferable that the same line re-display read processing circuit (114) comprises means which freely sets the number of times for which re-display processing is executed on the same line.

In this structure, it is possible to execute the re-display processing indefinitely, or alternatively, by setting the number of times and accordingly limiting the re-display processing to a certain range which will maintain a display quality, it is possible to suppress a drop of the frame frequency of a display image.

Alternatively, the image display control apparatus of the fourth or the fifth invention, it is preferable that the same line re-display read processing circuit (114) performs re-display processing of the same line so that the phase relationship is forced to shift between the cycles of display data transfer from the host computer (101) to the memory circuit (120) and the cycles of a display read access to the memory circuit (120).

In this structure, the same line re-display read processing circuit (114) performs the re-display processing of the same line, and the phase relationship is forcedly shifted between the cycles of display data transfer from the host computer (101) to the memory circuit (120) and the cycles of a display read access to the memory circuit (120). Hence, it is possible to reduce the frequency of later access contentions to the same address.

The following is preferable in the image display control apparatus of the fifth invention. That is, at the time that a contention is judged based on the output from the address contention judging circuit (112), the host retry pulse generating circuit (113) generates the second display read signal and the second display line data transfer signal as a pair for every contention and outputs these to the memory circuit (120), so that the latest updated data is always re-transferred to the line latch circuit (121) during writing of display data in the memory circuit (120). At the time that a contention is judged based on the output from the address contention judging circuit (112), the same line re-display read processing circuit (114) speedily performs re-display processing of the same line, and therefore, without displaying wrong data because of an access contention, the latest data held in the memory circuit (120) is re-transferred to the line latch circuit (121) and the latest data as it is after the contention has been resolved is displayed.

By means of this method, it is possible to more securely prevent displaying of wrong data attributed to an access contention.

As described above, using the image display control method and the image display control apparatus according to the present invention, addition of the host retry pulse generating circuit, the same line re-display read processing circuit or both of these makes it possible to prevent displaying of wrong data owing to an access contention.

Further, the same line re-display read processing circuit forcedly shifts the phase of display read from the phase relationship which gives rise to an access contention, thereby achieving an effect that a phase relationship which is less likely to cause an access contention is obtained.

DETAILED DESCRIPTION OF PREFERRED EMBODIMENTS

An embodiment of the present invention will now be described with reference to the associated drawings.

Embodiment

Figure 1:
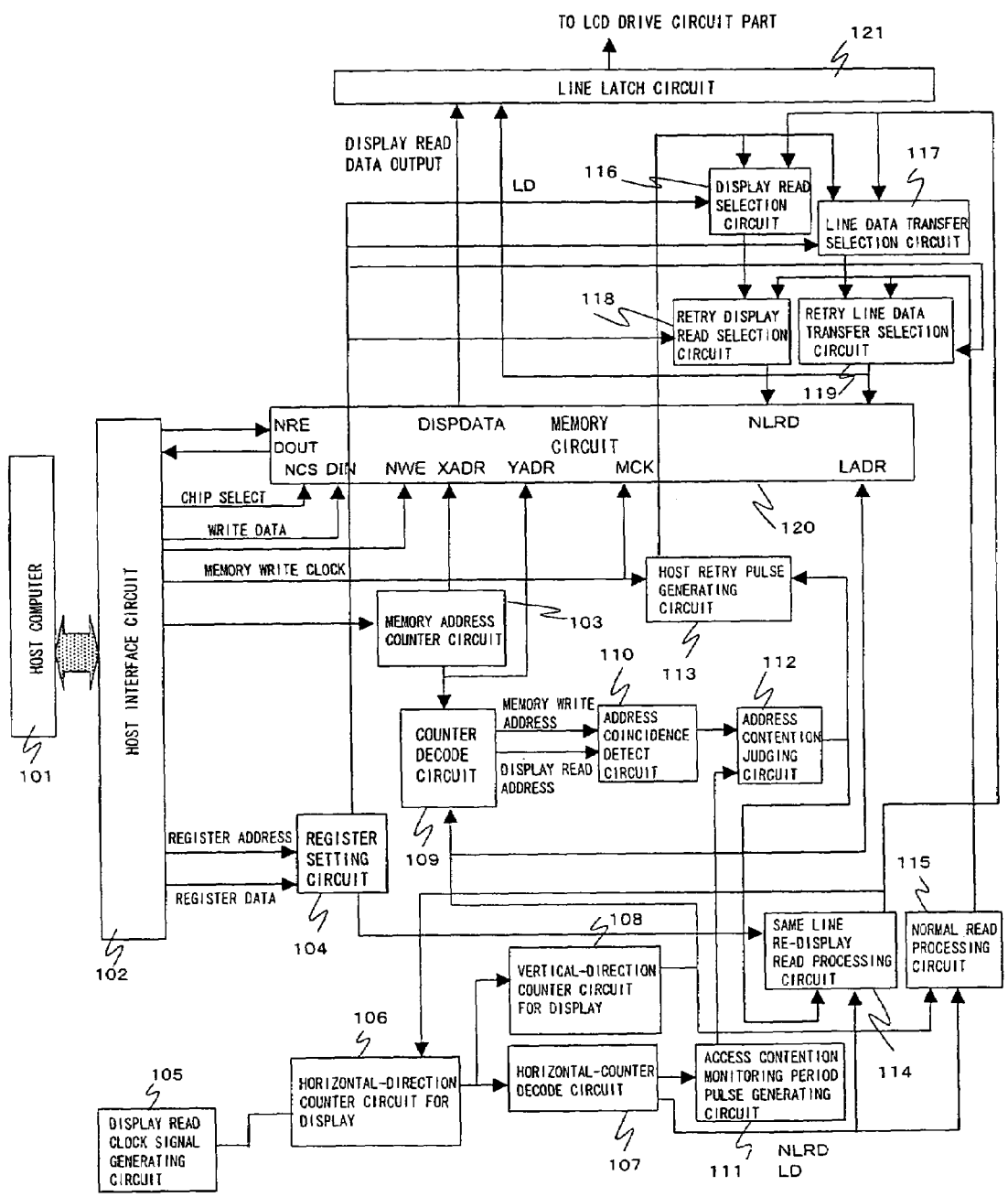
FIG. 1 is a block diagram which shows the structure of a liquid crystal display control apparatus according to an embodiment of the present invention.

FIG. 1 is a drawing of a liquid crystal display control apparatus according to an embodiment of the present invention and a circuit which provides a method of controlling the liquid crystal display apparatus.

In FIG. 1, denoted at 101 is a host computer.

Denoted at 102 is a host interface circuit. The host interface circuit 102 transfers display data with the host computer 101.

Denoted at 103 is a memory address counter circuit. The memory address counter circuit 103 receives a write address from the host interface circuit 102 and increments or decrements the address. To be more specific, using the write address received from the host interface circuit 102 as an initial value, the memory address counter circuit 103 increases or decreases the address. This structure is used for the following reason. When the entire screen needs be rewritten or the screen needs be rewritten only within a certain range (for instance, when a moving picture is to be displayed partially within a still image), automatic address update is executed after an initial value has been set. Thus, a consideration is given to a fact that increment/decrement, e.g., rotating of a liquid crystal panel changes the top and the bottom or the right and the left of the screen.

Denoted at 104 is a register setting circuit. The register setting circuit 104 receives a register write address and register write data from the host interface circuit 102.

Denoted at 105 is a display read clock signal generating circuit. The display read clock signal generating circuit 105 generates a display read clock signal which serves as a reference clock for displaying.

Denoted at 106 is a horizontal-direction counter circuit for display. The horizontal-direction counter circuit for display 106 counts the display read clock signal received from the display read clock signal generating circuit 105. Although not shown, the display read clock signal is fed not only to the horizontal-direction counter circuit for display 106 but also to other circuits which operate with reference to a display read clock.

Denoted at 107 is a horizontal-counter decode circuit. The horizontal-counter decode circuit 107 decodes an output signal of the horizontal-direction counter circuit for display 106 and outputs a display read signal and a display line data transfer signal. The display read signal is a signal for initialization of a display read bus for the purpose of displaying. Concurrently with this, data are transmitted (transferred) to an input of a line latch circuit 121. The display line data transfer signal causes a gate of the line latch circuit 121 to open for data acquisition and to close, and data is fixed after transmission of the display line data transfer signal. It is on the occasion that the data is updated in response to a host access during a period until transmission of the display line data transfer signal since initialization of the display read bus that display data is affected by an address contention.

Denoted at 108 is a vertical-direction counter circuit for display. The vertical-direction counter circuit for display 108 receives a predetermined output value of the horizontal-direction counter circuit for display 106 and increments or decrements.

Denoted at 109 is a counter decode circuit. The counter decode circuit 109 decodes an output from the vertical-direction counter circuit for display 108 and an output from the memory address counter circuit 103, and outputs a memory write address and a display read address.

A description will now be given on a relationship between a display read address and the outputs from the vertical-direction counter circuit for display 108 which is shown in FIG. 1 and a relationship between a memory write address and the outputs from the memory address counter circuit 103 which is shown in FIG. 1. In a macro-operational sense, this means the output from the vertical-direction counter circuit for display 108=the display read address. Despite this, the timing of counting up is different in reality. The vertical-direction counter circuit for display 108 updates a count value when the count value of the horizontal-direction counter circuit for display 106 is 0. After the vertical-direction counter circuit for display 108 has updated its count value, the display read address gets reflected (counting operation) when the count value of the horizontal-direction counter circuit for display 106 becomes 2. In the event that there is an access contention, once an address coincidence detect signal 310 has been detected, the display read address will not be updated even when the count value of the horizontal-direction counter circuit for display 106 is 2.

This operation is included in operations of the counter decode circuit 109, and the counter decode circuit 109 aligns the widths of output bits so that an address coincidence detect circuit 110 will detect coincidence.

The memory address counter circuit 103 outputs an X-address and a Y-address of a memory area. The counter decode circuit 109 is a block circuit which receives a counter output corresponding to the Y-address of these and a counter output corresponding to a display line address which is outputted from the vertical-direction counter circuit for display 108. Since the vertical-direction counter circuit for display 108 also counts a blanking period, it is possible that an output bit count of the memory address counter circuit 103 is different from that of the vertical-direction counter circuit for display 108. The counter decode circuit 109 is provided as the countermeasures against this. It is also possible that the output bit counts are not different.

To access the memory circuit 120, the memory address counter circuit 103 generates an X-direction address and a Y-direction address. A memory write address refers to an output representing the Y-direction address as it has been aligned as for bit count with the vertical-direction counter circuit for display 108.

Denoted at 110 is the address coincidence detect circuit. Receiving the memory write address and the display read address outputted from the counter decode circuit 109, the address coincidence detect circuit 110 judges whether the memory write address coincides with the display read address.

Denoted at 111 is the access contention monitoring period pulse generating circuit. The access contention monitoring period pulse generating circuit 111 generates a pulse which defines an access contention monitoring period based on an output from the horizontal-counter decode circuit 107.

Denoted at 112 is an address contention judging circuit. The address contention judging circuit 112 judges whether there is a contention between the display read address and the memory write address, based on outputs from the address coincidence detect circuit 110 and the access contention monitoring period pulse generating circuit 111.

Denoted at 113 is a host retry pulse generating circuit. The host retry pulse generating circuit 113 receives a memory write clock from the host interface circuit 102 and an output from the address contention judging circuit 112, and during the access contention monitoring period, generates a display read signal and a display line data transfer signal based on the memory write clock as an access contention arises.

Denoted at 114 is a same line re-display read processing circuit. The same line re-display read processing circuit 114 receives a display read signal and a display line data transfer signal outputted from the horizontal-counter decode circuit 107 and the output from the address contention judging circuit 112, and during the access contention monitoring period, generates a display read signal and a display line data transfer signal which will be used for execution of the same line re-display read processing, without moving to the next line as an access contention arises.

Denoted at 115 is a normal read processing circuit. The normal read processing circuit 115 generates a display read signal and a display line data transfer signal which will be used for execution of normal read processing, based on the display read signal and the display line data transfer signal outputted from the horizontal-counter decode circuit 107 and an output value of the vertical-direction counter circuit for display 108.

Denoted at 116 is a display read selection circuit. In accordance with an output from the register setting circuit 104, the display read selection circuit 116 selects a state that of the display read signal outputted from the host retry pulse generating circuit 113 and the display read signal outputted from the same line re-display read processing circuit 114, only the display read signal outputted from the host retry pulse generating circuit 113 is outputted, a state that the display read signal outputted from the same line re-display read processing circuit 114 alone out of these two is outputted, or a state that both the display read signal outputted from the host retry pulse generating circuit 113 and the display read signal outputted from the same line re-display read processing circuit 114 are made valid and outputted.

Denoted at 117 is a line data transfer selection circuit. In accordance with an output from the register setting circuit 104, the line data transfer selection circuit 117 selects a state that of the display line data transfer signal outputted from the host retry pulse generating circuit 113 and the display line data transfer signal outputted from the same line re-display read processing circuit 114, only the display line data transfer signal outputted from the host retry pulse generating circuit 113 is outputted, a state that the display line data transfer signal outputted from the same line re-display read processing circuit 114 alone out of these two is outputted, or a state that both the line data transfer selection circuit 117 selects a state that of the display line data transfer signal outputted from the host retry pulse generating circuit 113 and the display line data transfer signal outputted from the same line re-display read processing circuit 114 are made valid and outputted.

Selecting operations of the display read selection circuit 116 and the line data transfer selection circuit 117 mentioned above will now be described. To make the both signals valid in the display read selection circuit 116 and the line data transfer selection circuit 117 mentioned above means to allow simultaneous execution of both a host retry (During writing, post-writing data is always re-displayed.) and a display retry (Without shifting the display line to the next line, the same line is re-displayed.).

Since a display read signal and a display line data transfer signal are generated as a pair in response to a host retry, the both pulses are apart by a certain time difference. When a host retry is executed in faster cycles than this time difference, although the host retry operation does not become valid, displaying of wrong data can be prevented since the display retry operation becomes valid.

The selecting operations of the display read selection circuit 116 and the line data transfer selection circuit 117 mentioned above may be combined for the following three instances:

a. When the host retry operation alone is desired;
b. When the display retry operation alone is desired; and
c. When the host retry operation/the display retry operation is desired (The both are made valid.).

Denoted at 118 is a retry display read selection circuit which selectively outputs either one of the display read signal outputted from the display read selection circuit 116 and the display read signal outputted from the normal read processing circuit 115 in accordance with an output from the register setting circuit 104.

Denoted at 119 is a retry line data transfer selection circuit which selectively outputs either one of the display line data transfer signal outputted from the line data transfer selection circuit 117 and the display line data transfer signal outputted from the normal read processing circuit 115 in accordance with an output from the register setting circuit 104.

Denoted at 120 is a memory circuit. The memory circuit 120 receives the output from the host interface circuit 102, the output from the memory address counter circuit 103, the output from the vertical-direction counter circuit for display 108, the output from the retry display read selection circuit 118 and the output from the retry line data transfer selection circuit 119, and stores display data which are to be displayed by the liquid crystal display apparatus.

In the memory circuit 120, denoted at NRE is a read enable signal. Denoted at DOUT is a data output. Denoted at NCS is a chip select signal. Denoted at DIN is a data input. Denoted at NWE is a write enable signal. Denoted at XADR is a horizontal address. Denoted at YADR is a vertical address. Denoted at MCK is a memory write clock. Denoted at NLRD is a display line read signal. Denoted at LADR is a line address.

Denoted at 121 is a line latch circuit. The line latch circuit 121 receives the output from the memory circuit 120 (display read data output) and the output from the retry line data transfer selection circuit 119 (display line data transfer signal LD), and supplies an output to a drive circuit part of the liquid crystal display apparatus.

Operations of this liquid crystal display control apparatus will now be described.

A write access request from the host computer 101 is fed to the host interface circuit 102. The address signal of thus fed access request is supplied to the memory address counter circuit 103. The memory address counter circuit 103 then operates in response to the access request, thereby sequentially updating a physical address value to the memory circuit 120.

The host interface circuit 102 also outputs a register write address and register write data and accordingly sets up operation commands for the register setting circuit 104. The display read selection circuit 116, the line data transfer selection circuit 117, the retry display read selection circuit 118, the retry line data transfer selection circuit 119 and the same line re-display read processing circuit 114 operate in accordance with outputs from the register setting circuit 104, namely, the operation commands thus set up.

Selecting operations of the selection circuits 116 through 119 mentioned above will now be described. As pulses to be generated as a pair in response to a host retry, there are two signals of a display read signal and a display line data transfer signal. As signals needed for the display retry operation, there also are two signals of a display read signal and a display line data transfer signal. The selection circuits 116 through 119 above choose so that one of the two signals will become valid, the both signals will become valid, or neither a host retry nor a display retry will be exercised (=the conventional operations).

The selecting operations are then fixed to the state which has been set up at the beginning in the register setting circuit 104. Depending upon the settings, a combination such as the normal read processing circuit 115+the same line read processing circuit 115 is selected.

The display read clock signal generating circuit 105 generates a display read clock signal which will be then fed to the horizontal-direction counter circuit for display 106. Every time the display read clock signal is fed, the horizontal-direction counter circuit for display 106 updates a counter value. An output from the horizontal-direction counter circuit for display 106 is fed to the horizontal-counter decode circuit 107 and the vertical-direction counter circuit for display 108. The horizontal-counter decode circuit 107 decodes the output value of the horizontal-direction counter circuit for display 106, and outputs a display read signal and a display line data transfer signal. Meanwhile, the vertical-direction counter circuit for display 108 counts up or down every time the output value of the horizontal-direction counter circuit for display 106 reaches a predetermined value.

An output from the vertical-direction counter circuit for display 108 and an output from the memory address counter circuit 103 are fed to the counter decode circuit 109, and a display read address and a memory write address are each outputted.

The outputs from the counter decode circuit 109 are fed to the address coincidence detect circuit 110. The address coincidence detect circuit 110 compares the display read address with the memory write address, determines whether the two addresses coincide with each other, and outputs the result.

The output from the horizontal-counter decode circuit 107 is fed to the access contention monitoring period pulse generating circuit 111. An output from the access contention monitoring period pulse generating circuit 111 and the output from the address coincidence detect circuit 110 are fed to the address contention judging circuit 112. The address contention judging circuit 112 judges whether a contention has occurred and outputs the result.

In response to the output from the address contention judging circuit 112 and the output from the host interface circuit 102, the memory write clock is fed to the host retry pulse generating circuit 113. The host retry pulse generating circuit 113 then generates a pair of a display read signal and a display line data transfer signal from the memory clock, in accordance with the result outputted from the address contention judging circuit 112.

The output from the address contention judging circuit 112, the output from the horizontal-counter decode circuit 107 and the output from the register setting circuit 104 are fed to the same line re-display read processing circuit 114. In accordance with the result outputted from the address contention judging circuit 112, that is, when an address contention has occurred, the same line re-display read processing circuit 114 then executes processing of re-generating a display line data transfer signal for the contention-bearing line.

Figure 3:
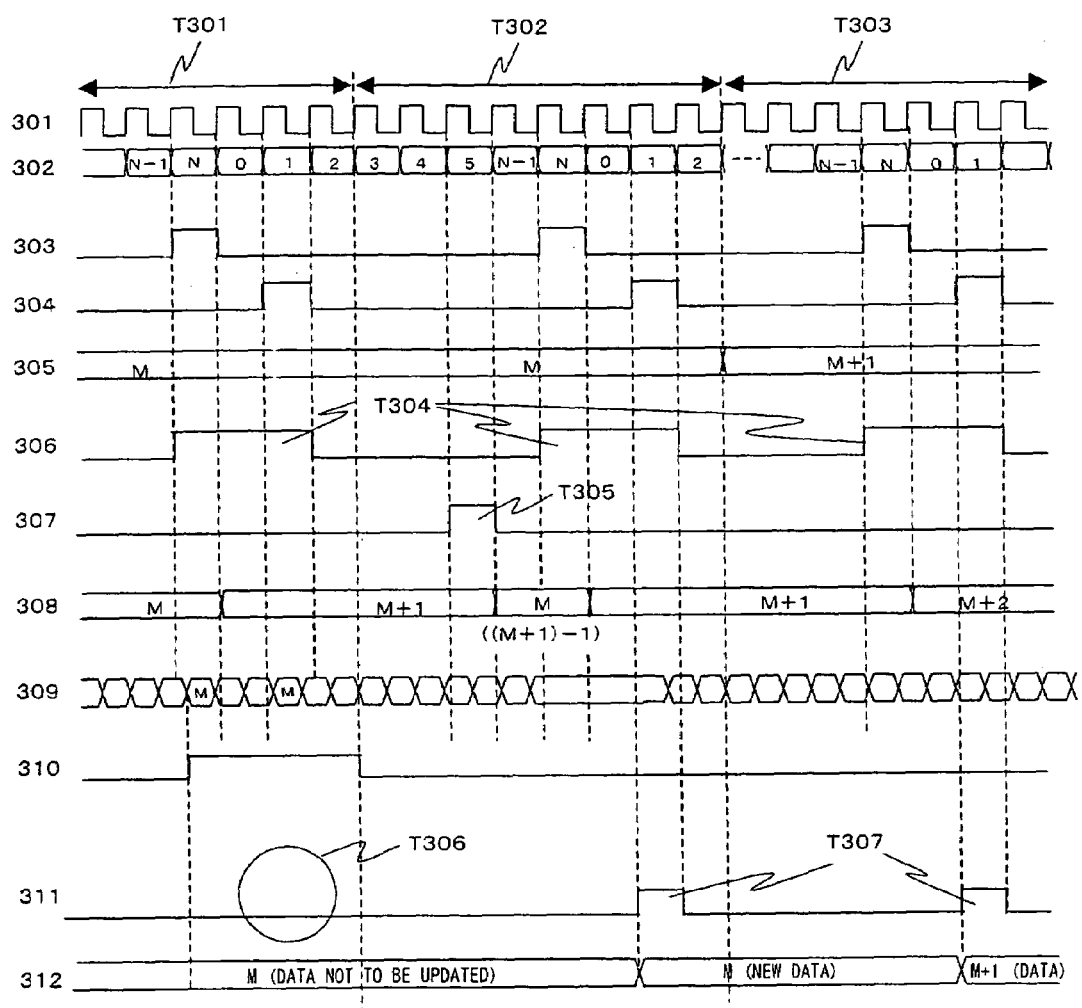
FIG. 3 is a timing chart which shows an example of specific operations of mainly a same line re-display read processing circuit 114.
Figure 4:
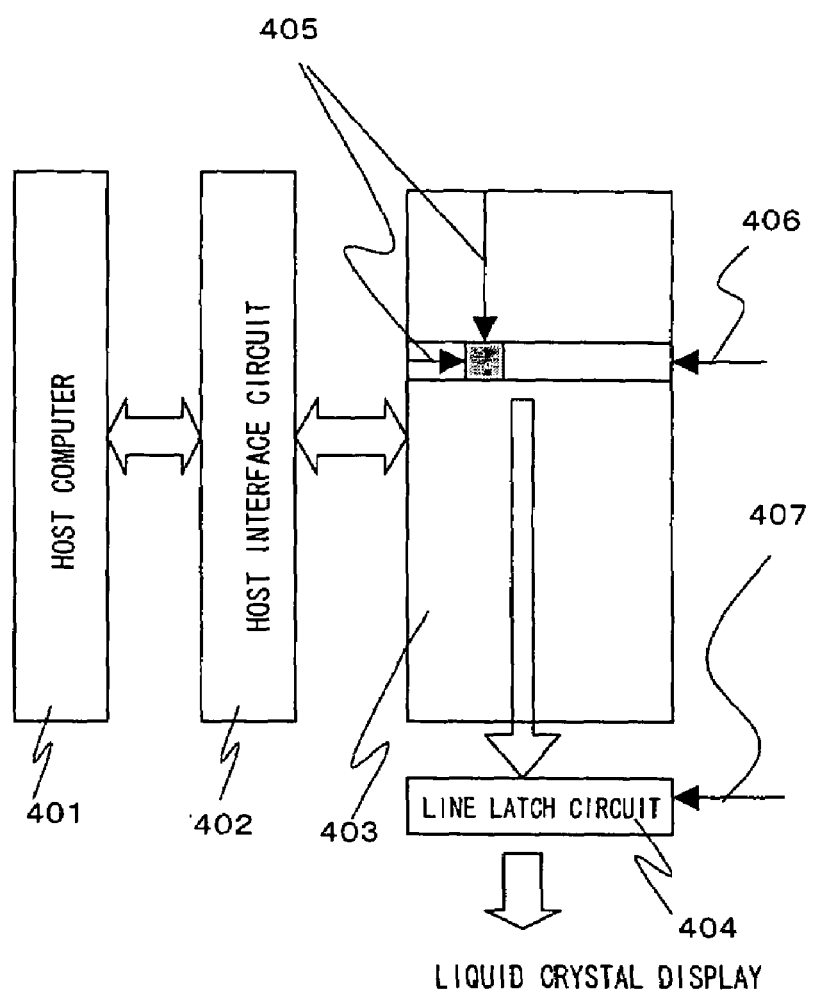
FIG. 4 is a schematic block diagram of a conventional liquid crystal display control apparatus as it handles a liquid crystal display (image display) request and a host computer access request.
Figure 5:
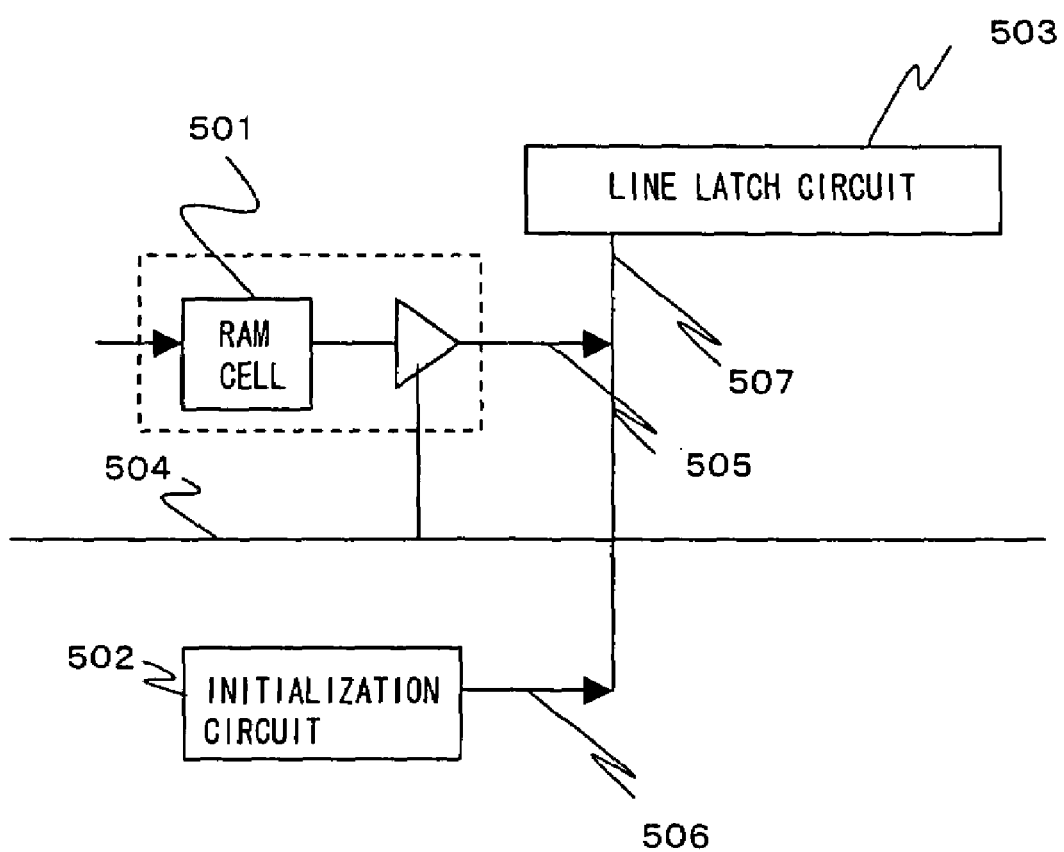
FIG. 5 is a schematic drawing which shows an example of a 1-bit structure within a memory circuit and a relationship with a line latch circuit.
Figure 6:
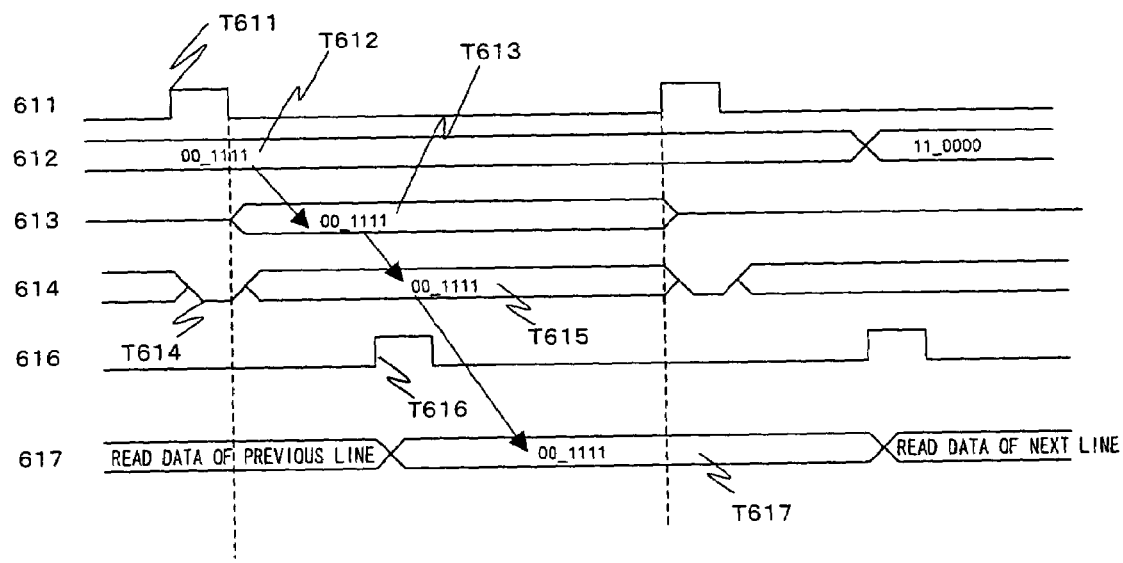
FIG. 6 is a timing chart which shows an example that there is no contention between an access request from a host computer and an access request for liquid crystal display (image display)

Further, upon detection of the address contention, the same line re-display read processing circuit 114 outputs a horizontal-direction counter skip signal (307 in FIG. 3). Receiving the horizontal-direction counter skip signal (307 in FIG. 3), the horizontal-direction counter circuit for display 106 skips a horizontal-direction counter value to (N−1).

The output from the horizontal-counter decode circuit 107 and the output from the vertical-direction counter circuit for display 108 are fed to the normal read processing circuit 115. The normal read processing circuit 115 executes the normal read processing. As a result, the liquid crystal display apparatus displays the display data as an image.

The output from the host retry pulse generating circuit 113 and the output from the same line re-display read processing circuit 114 are supplied to the display read selection circuit 116, and an output of the display read selection circuit 116 is determined in accordance with the output from the register setting circuit 104. To be specific, a state that of a display read signal outputted from the host retry pulse generating circuit 113 and a display read signal outputted from the same line re-display read processing circuit 114, only the display read signal outputted from the host retry pulse generating circuit 113 is outputted, a state that the display read signal outputted from the same line re-display read processing circuit 114 alone out of these two is outputted, or a state that both the display read signal outputted from the host retry pulse generating circuit 113 and the display read signal outputted from the same line re-display read processing circuit 114 are made valid and outputted is selected, in accordance with the output from the register setting circuit 104.

The output from the display read selection circuit 116 and the output from the normal read processing circuit 115 are supplied to the retry display read selection circuit 118, and an output of the retry display read selection circuit 118 is determined in accordance with the output from the register setting circuit 104. To be specific, either the display read signal outputted from the display read selection circuit 116 or the display read signal outputted from the normal read processing circuit 115 is selectively outputted in accordance with the output from the register setting circuit 104.

In a similar fashion, the output from the host retry pulse generating circuit 113 and the output from the same line re-display read processing circuit 114 are supplied to the line data transfer selection circuit 117, and an output of the line data transfer selection circuit 117 is determined in accordance with the output from the register setting circuit 104. To be specific, a state that of a display line data transfer signal outputted from the host retry pulse generating circuit 113 and a display line data transfer signal outputted from the same line re-display read processing circuit 114, only the display line data transfer signal outputted from the host retry pulse generating circuit 113 is outputted, a state that the display line data transfer signal outputted from the same line re-display read processing circuit 114 alone of these two is outputted, or a state that both the display line data transfer signal outputted from the host retry pulse generating circuit 113 and the display line data transfer signal outputted from the same line re-display read processing circuit 114 are made valid and outputted is selected, in accordance with the output from the register setting circuit 104.

The output from the line data transfer selection circuit 117 and the output from the normal read processing circuit 115 are supplied to the retry line data transfer selection circuit 119, and an output of the retry line data transfer selection circuit 119 is determined in accordance with the output from the register setting circuit 104. To be specific, either the display line data transfer signal outputted from the line data transfer selection circuit 117 or the display line data transfer signal outputted from the normal read processing circuit 115 is selectively outputted in accordance with the output from the register setting circuit 104.

This makes it possible to select whether to always update display data to the latest state during writing upon occurrence of an access contention. Further, it is possible to select whether to execute the same line re-display read processing when an access contention has occurred.

When there is no access contention, the normal read processing is carried out.

In the case of a host retry, whether to output a pair of pulses and the normal read processing circuit may be selected.

Meanwhile, for a display retry, it is necessary that the content of the processing is switched appropriately for when there is an access contention and for when there is no access contention. In FIG. 1, the register selects such that the normal read processing circuit 115 and the same line re-display read processing circuit 114 will have OR-like structures. As an access contention arises, the same line re-display read processing circuit 114 receives the signal from the address contention judging circuit 112, and upon receipt of the signal, a processing signal which invalidates the signal from the normal read processing circuit 115 is outputted also from the same line re-display read processing circuit 114. To be specific, the address coincidence detect signal 310 shown in FIG. 3 is outputted also from the same line re-display read processing circuit 114, thereby invalidating pulses like a display line data transfer signal 311.

Although the selection circuits 116 through 119 above are referred to as selection circuits, the selection circuits are selectively combined with each other instead of choosing only one of the selection circuits.

Further, in accordance with a combination of the outputs from the register setting circuit 104, it is possible to allow only the output from the retry display read selection circuit 118, only the output from the retry line data transfer selection circuit 119, or the outputs from both the retry display read selection circuit 118 and the retry line data transfer selection circuit 119, and hence, to avoid displaying of display data which has been influenced by an access contention.

The selecting operations of the selection circuits 116 through 119 above will now be further described. Since a display read signal and a display line data transfer signal are generated in a pair for a host retry, there is a certain time difference between pulses. When a host access is made in cycles which are faster than this time difference, the host retry operation does not become valid. In such a case, the display retry operation is selected, whereby displaying of wrong data is prevented. Conversely, since execution of a display retry extends the duration of the retried line when a host access is in slow cycles, the frame frequency for displaying of an image could decrease and the displaying quality could deteriorate, and therefore, selection of the host retry operation can prevent displaying of wrong data in such a case. Outputting of the both may be chosen when it is hard to determine the host access cycles, to thereby benefit from the both effects and prevent displaying of wrong data.

At the time of the retry operation, the output from the normal read processing circuit is always handled as if the output was OR. Even when only a host retry is chosen, they must execute the normal read processing in the absence of a host access. Even when only a display retry is chosen, they must execute the normal read processing unless an access contention arises.

Even though the output is handled as if it was OR, upon occurrence of an access contention, they receive from the host retry pulse generating circuit 113, the same line re-display read processing circuit 114 or the like something resembling an enable signal which invalidates the normal read processing and prioritizes processing of a host retry or processing of a display retry, whereby invalidating processing is performed.

The register settings may realize the following three selections:

1. Where whether to execute the host retry processing is to be selected, when the host retry processing is to be executed, the host retry processing+the normal read processing circuit is selected;

2. Where whether to execute the display retry processing is to be selected, when the display retry processing is to be executed, the display retry processing+the normal read processing circuit is selected; and 3. Where no retry processing is to be executed for 1. or 2., the normal read processing circuit is selected.

The memory circuit 120 receives the outputs of the host interface circuit 102 (the chip select signal, write data, the memory write clock), the output of the retry display read selection circuit 118 (the display read signal), the output of the retry line data transfer selection circuit 119 (the display line data transfer signal) and the output of the vertical-direction counter circuit for display 108 (line address), whereby display data is stored. The line latch circuit 121 receives thus stored display data line by line as the output from the memory circuit 120 in accordance with the output from the retry line data transfer selection circuit 119 (the display line data transfer signal). The output from the line latch circuit 121 is propagated to an LCD drive circuit part.

Operations of the host retry pulse generating circuit 113 and the same line re-display read processing circuit 114 will now be described.

Figure 2:
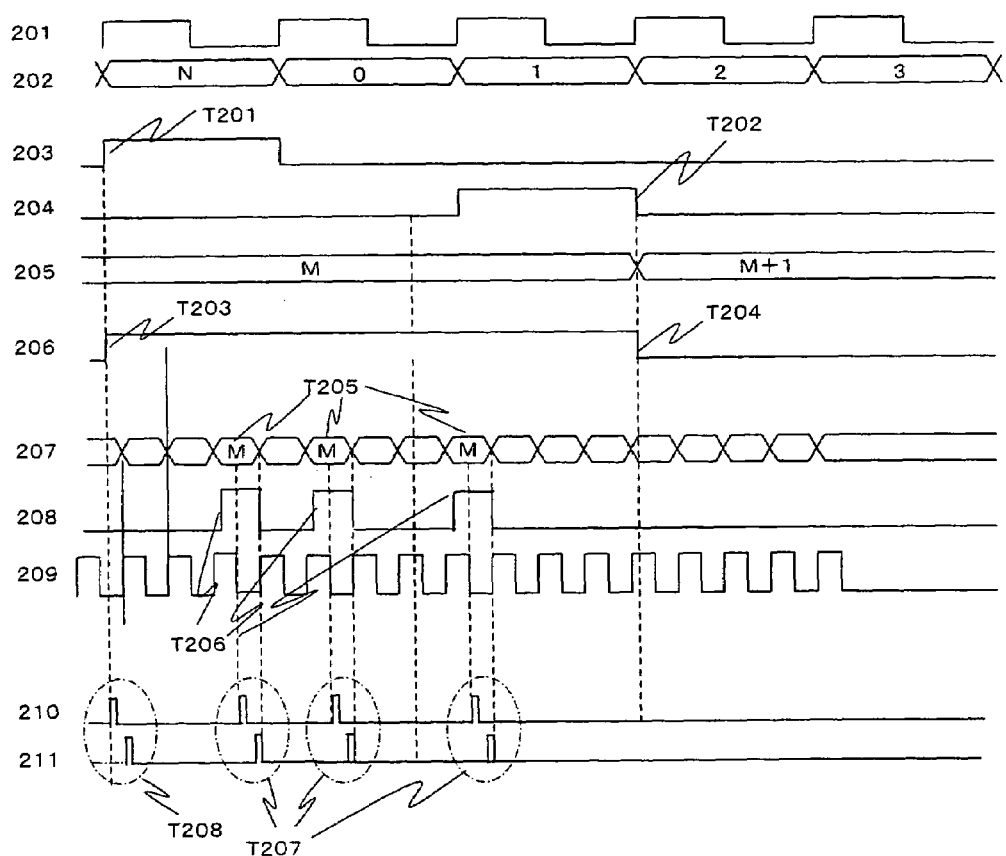
FIG. 2 is a timing chart which shows an example of specific operations of mainly a host retry pulse generating circuit 113.

FIG. 2 is a timing chart of a specific example of mainly the host retry pulse generating circuit 113.

In FIG. 2, denoted at 201 is the display read clock signal outputted from the display read clock signal generating circuit 105. Denoted at 202 is the horizontal-direction counter signal outputted from the horizontal-direction counter circuit for display 106. Denoted at 203 is the display read signal outputted from the normal read processing circuit 115. Denoted at 204 is the display line data transfer signal outputted from the normal read processing circuit 115. Denoted at 205 is the display read address signal outputted from the counter decode circuit 109. Denoted at 206 is an access contention monitoring period pulse signal outputted from the access contention monitoring period pulse generating circuit 111. Denoted at 207 is the memory write address signal outputted from the counter decode circuit 109. Denoted at 208 is the address coincidence detect signal outputted from the address coincidence detect circuit 110. Denoted at 209 is the memory write clock signal outputted from the host interface circuit 102. Denoted at 210 is the display read signal outputted from the host retry pulse generating circuit 113. Denoted at 211 is the display line data transfer signal outputted from the host retry pulse generating circuit 113.

The retry operations associated with the host retry pulse generating circuit 113 will now be described. The horizontal-direction counter signal 202 is counted up sequentially in response to the display read clock signal 201 and returns to zero as the counter value reaches a predetermined value N. The display read signal 203 shows a high-level pulse when the value of the horizontal-direction counter signal 202 becomes N. The display line data transfer signal 204 shows a high-level pulse when the value of the display read clock signal 201 becomes 1.

The access contention monitoring period pulse 206 is a signal which defines the duration from the timing T201 at which the display read signal 203 rises to the timing T202 at which the display line data transfer signal 204 falls, and therefore, indicates that this duration is a period which is influenced by an address contention. The address coincidence detect signal 208 which is at the high level is generated when the memory write address signal 207 becomes to represent an address M while the display read address signal 205 is indicative of the address M and the access contention monitoring period pulse 206 is active, that is, during a period from the timing T203 to the timing T204. As the address coincidence detect signal 208 is generated, the host retry pulse generating circuit 113 generates the display read signal 210 and the display line data transfer signal 211 in synchronization to the memory write clock signal 209.

Once the display read signal 210 and the display line data transfer signal 211 have been thus generated as a pair, every time an access contention arises at the timing T207, the line latch circuit 121 is updated to the latest information. This prevents displaying of wrong data. As a pulse pair T208 (i.e., the display read signal 210 and the display line data transfer signal 211) is generated at the timing T203 which is the start of the access contention monitoring period, in the absence of an access contention, processing equivalent to the normal display read is executed except for that no updating is performed.

When a host retry is desired, as the access contention monitoring period starts, the display read signal and the display line data transfer signal are outputted as a pair first, and the display read data is then updated. This is because the access contention monitoring period has already started (i.e., the normal display read signal has been already received). It is important to update the display data immediately after the start of the access contention monitoring period regardless of whether there is an access contention. For instance, unlike in FIG. 2, if no access contention occurs after this, owing to the updating of the display data executed at the beginning, the data on this display line will be read (which is the same as refreshing). But for these first signals, no pulse will be generated in the absence of a contention. This means that no line data transfer signal will be outputted, the line count corresponding to the display line alone will be updated, and the line data information on the immediately precedent line will be displayed continuously as the display data. To prevent this, immediately after the start of the access contention monitoring period, pulses are generated once regardless of whether a contention has occurred.

In FIG. 2, as the host retry is to be executed, the output from the same line re-display read processing circuit 114 is invalidated. Hence, the signals from the host retry pulse generating circuit 113 and the normal read processing circuit become valid. However, the output from the normal read processing circuit 115 in the host retry mode is utilized for generation of the access contention monitoring period pulse.

FIG. 3 is a timing chart which shows an example of specific operations of mainly the same line re-display read processing circuit 114.

In FIG. 3, denoted at 301 is the display read clock signal outputted from the display read clock signal generating circuit 105. Denoted at 302 is the horizontal-direction counter signal outputted from the horizontal-direction counter circuit for display 106. Denoted at 303 is the display read signal outputted from the normal read processing circuit 115. Denoted at 304 is the display line data transfer signal outputted from the normal read processing circuit 115. Denoted at 305 is the display read address signal outputted from the counter decode circuit 109. Denoted at 306 is an access contention monitoring period pulse signal outputted from the access contention monitoring period pulse generating circuit 111. Denoted at 307 is the horizontal-direction counter skip signal. Denoted at 308 is the vertical-direction counter signal outputted from the vertical-direction counter circuit for display 108. Denoted at 309 is the memory write address signal outputted from the counter decode circuit 109. Denoted at 310 is the address coincidence detect signal outputted from the address coincidence detect circuit 110. Denoted at 311 is the line data transfer signal outputted from the same line re-display read processing circuit 114. Denoted at 312 is an address state during display read by the same line re-display read processing circuit 114. Denoted at T301 is a display line period upon occurrence of an access contention. Denoted at T302 is the same line re-display read line period. Denoted at T303 is the next read line period.

The horizontal-direction counter signal 302 is sequentially updated in response to the display read clock signal 301 and returns to zero as the counter value reaches the predetermined value N. The display read signal 303 shows a high-level pulse when the value of the horizontal-direction counter signal 302 becomes N. The display line data transfer signal 304 shows a high-level pulse when the value of the horizontal-direction counter signal 302 becomes 1. The access contention monitoring period pulse signal 306 is a signal which defines the duration from rising of the display read signal 301 to falling of the display line data transfer signal 304, and this duration is a period which is influenced by an address contention. The address coincidence detect signal 310 which is at the high level is generated when the value of the memory write address signal 309 reaches M while the value of the display read address 305 is M and during the period T304 that the access contention monitoring period pulse signal 306 remains valid.

As the address coincidence detect signal 310 is generated, the same line re-display read processing circuit 114 executes such processing that a high-level pulse of the line data transfer signal 311 will not be generated during T306. Since the line data transfer signal 311 is not generated at the timing T306 while the vertical-direction counter signal 308 is updated to M+1, the line data will not be transferred. Since the display read address 305 does not refer to the value of the vertical-direction counter signal 308, even after the value of the vertical-direction counter signal 308 the display data on the M line has been updated to (M+1) because of the vertical-direction counter signal 308, the display read address 305 remains M, and the display data on the M line displayed again, the same line is displayed again (T301, T302).

Once the address coincidence detect signal 310 has been generated, the horizontal-direction counter skip signal 307 is generated at the timing T305 and the horizontal-direction counter signal 302 is skipped to N−1. During the same line re-display read line period T302, the value of the horizontal-direction counter signal 302 is skipped to (N−1) in accordance with the horizontal-direction counter skip signal 307 and the value of the vertical-direction counter signal 308 is returned to M which is the immediately precedent value. When the value of the horizontal-direction counter signal 302 returns to zero later, the vertical-direction counter signal 308 is updated and remains as (M+1).

Further describing this, the vertical-direction counter value does not directly represent a display line. A display line has the value of the display read address 305. As operations inside the circuit, the count is updated with the end-most count value of the horizontal-direction counter signal 302 with reference to the vertical-direction counter signal 308. However, at this point, the display line has the value of the display read address 305. In short, while the display read address 305 is updated with reference to the value of the vertical-direction counter signal 308 when there is no access contention, upon occurrence of an access contention, the value of the vertical-direction counter signal 308 is not referred to and the display line is not updated.

Figure 7:
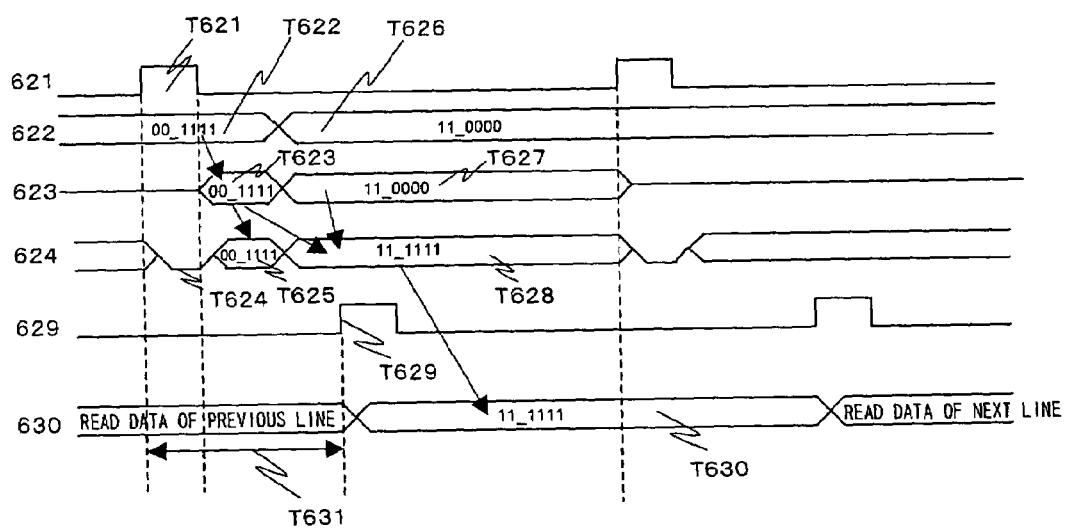
FIG. 7 is a timing chart which shows an example that a contention arises between an access request from a host computer and an access request for liquid crystal display (image display).

Changes of the display read address 305, the vertical-direction counter 308, the line data transfer signal 311 and the display data 312 will now be described in detail. The vertical-direction counter 308 updates the count value when the count value of the horizontal-direction counter 302 becomes zero. With reference to this count value, the display read address 305 updates the count value as the count value of the horizontal-direction counter 302 becomes 2 (i.e., when the display line data transfer signal 304 falls). However, the display read address 305 does not update the count value if the address coincidence detect signal 310 is high. Further, when the address coincidence detect signal 310 is high, the line data transfer signal 311 masks the display line data transfer signal 304. Thus, the line data transfer signal 311 does not turn on during the period denoted at the symbol o, and therefore, the data in the line latch circuit 121 fails to be re-written and the display data remains as the non-updated data which is at the M line. In short, when the display line data transfer signal 629 does not turn on as described with reference to the operation chart in FIG. 7, the previous data remains outputted as the output from the line latch circuit. The display data 312 therefore becomes as shown in FIG. 3.

FIG. 3 is for description of the same line re-display read processing for contending operations, and the values of the display read address 305 and the vertical-direction counter 308 do not change in association with each other. This will now be described in detail.

The display read address 305 is the address of the currently displayed line. The display read address 305 is counted (UP/DOWN) at the timing of the next display read clock 301 (=when the horizontal-direction counter value becomes 2) after outputting of the display line data transfer signal 304, during the normal operations. In contrast, the vertical-direction counter signal 308 is counted (UP/DOWN) usually when the value of the horizontal-direction counter signal 302 is zero. In response to outputting of the display line data transfer signal 304, the display read address 305 becomes indicative of the value of the vertical-direction counter signal 308 in synchronization to the next display read clock 301. The display line data transfer signal 304 in FIG. 3 represents the output timing during the normal operations, while the line data transfer signal 311 represents the output timing upon occurrence of a contention, during the re-display read processing and at the normal time. The display read address 305 is indicative of a contention-induced decode value which corresponds to outputting of the address coincidence detect signal 310.

Although updating to (M+1) is supposed to take place since the vertical-direction counter signal 308 has become (M+1), M is kept without any updating to (M+1) since the line data transfer signal 311 has not turned on. Because of this, the display line will not move to the next line, and in an effort to execute the re-display read processing on the same line, the horizontal-direction counter skip signal 307 will turn on and the horizontal-direction counter value will skip to N−1 for displaying again. When no address contention has not occurred yet at the time of the re-display operation, the pulse T307 of the line data transfer signal 311 appears and the normal operations are restored. In the event that a contention has occurred, the skip operation is repeated during the period T302.

In the host retry mode, the output of the normal read processing circuit 115 is utilized for generation of the access contention monitoring period pulse but is not used as a display read signal or display line data transfer signal for the purpose of displaying. A display read signal and a display line data transfer signal generated as a pair are used in the host retry mode. Paired pulses are generated at the beginning of the access contention monitoring period in the host retry mode and this pair plays the role of the normal read processing, and therefore, the output from the normal read processing circuit 115 is not necessary.

In the display retry mode, the output of the normal read processing circuit 115 is used. Upon occurrence of a contention, the same line re-display read processing circuit 114 outputs the mask signal and the display line data transfer signal from the normal read processing circuit 115 is made invalid. When the host retry mode and the display retry mode are both to be active, the paired pulses generated at the beginning of the access contention monitoring period for the host retry mode function as pulses which are demanded for each line for the normal read processing. Hence, even though a display retry has not been attempted, the same processing as the normal read processing is executed. When there is an attempted display retry, although the processing of masking the display line data transfer signal is performed, since the signals for the normal read processing are unusable owing to the register settings corresponding to the activation of the both modes, the re-display read processing alone is performed except for masking of the display line data transfer signal.

A difference between the address coincidence detect signals 208 and 310 shown in FIGS. 2 and 3 will now be described.

FIG. 3 is for describing the display retry mode. In the display retry mode, as an access contention arises during the access contention monitoring period (=from rising of the display read signal 303 to falling of the display line data transfer signal 304; the access contention monitoring period pulse signal 306), the re-display read processing is performed on the same line after the access contention monitoring period has ended. Since the processing is thus executed in response even to one access contention during the access contention monitoring period, however more often contentions arise during the access contention monitoring period, outputting of the detect signal responding to the first contention would be enough. By means of latching of the first contention detect signal, the pulse width of the address coincidence detect signal 310 widens.

FIG. 2 is for describing the host retry mode. In the host retry mode, every time an access contention arises owing to a write access made by the host computer during the access contention monitoring period (=from rising of the display read signal 203 to falling of the display line data transfer signal 204; the access contention monitoring period pulse signal 206), re-display read of the latest data written within the cycles is performed. To this end, a display read signal and a display line data transfer signal are generated as a pair. Once the pair of the display read signal and the display line data transfer signal has been thus generated, the address coincidence detect signal is turned off and the next access contention is monitored. The address coincidence detect signal therefore falls at the location where the display line data transfer signal 211 falls.

A display read signal and a display line data transfer signal to be fed to the memory circuit are summarized as shown in the table below.

TABLE 1

| Mode | Host retry | | Display retry | | Normal read | |
|---|---|---|---|---|---|---|
| | Display read signal | Line data transfer signal | Display read signal | Line data transfer signal | Display read signal | Line data transfer signal |
| Host retry | ○ | ○ | X | X | X | X |
| Display retry | X | X | ○ | ○ | ○ | ○ |
| Host retry + display retry | ○ | ○ | X | ○ | X | X |
| Normal processing | X | X | X | X | ○ | ○ |

○; valid
X; invalid

In the table above, the pulses for the normal processing are invalidated during the display retry processing, upon occurrence of a contention.

This is repeated until the address coincidence detect signal 310 becomes undetected or for a predetermined number of times. With the horizontal-direction counter signal 302 skipped, it is possible on the display read side to forcedly shift the phase in which an access contention arises and accordingly prevent displaying of wrong data. As the address coincidence detect signal 310 becomes turned off, the display line data transfer signal in the same line re-display read processing circuit 114 is generated as shown at the timing T307, the period proceeds to the next line period T302, and the vertical-direction counter signal 308 resumes updating. The display read signal 303 is always outputted at the illustrated timing regardless of whether a contention has occurred. When a display retry is attempted, the signal is masked like the display line data transfer signal 311 as a contention occurs, but is outputted normally when no contention has occurred.

The polarities of the signals, the counter values and the like shown in FIGS. 2, 3, 4, 5 and 6 are mere examples.

Although both the host retry pulse generating circuit 113 and the same line re-display read processing circuit 114 are disposed and these are selectively used by means of the display read selection circuit 116 and the line data transfer selection circuit 117 or the both are made valid and used according to the embodiment described above, it is not necessary to dispose both the host retry pulse generating circuit 113 and the same line re-display read processing circuit 114. Either one of these may be disposed instead. In that case, neither the display read selection circuit 116 nor the line data transfer selection circuit 117 is needed of course.

In addition, while the embodiment described above is directed to an example that the image display control method and the image display control apparatus of the present invention are applied to a liquid crystal display control apparatus, the present invention is not limited only to a liquid crystal display control apparatus but is similarly applicable to a plasma display control apparatus and an EL (electro-luminescence) display control apparatus which have a structure that data covering one line is read for displaying in accordance with a read signal.

The invention claimed is:

1. An image display control method, comprising:
   reading display data written in a memory circuit in the units of lines;
   holding said display data read from said memory circuit in the units of lines in a line latch circuit;
   supplying said display data in the units of lines to an image display apparatus from said line latch circuit such that said image display apparatus accordingly displays an image;
   detecting an access contention for the same address in said memory circuit, which occurs between writing to update said display data and reading of said display data to display an image; and
   in response to detection of said access contention, generating a display read signal and a display line data transfer signal based on a memory write clock; and
   supplying said display read signal and said display line data transfer signal to said memory circuit while supplying said display line data transfer signal to said line latch circuit which holds, in the units of lines, data which has been read out from said memory circuit, whereby said display data representing the line for which said access contention has occurred is read out from said memory circuit and transferred to said line latch circuit.

2. The image display control method of claim 1, wherein for every contention, said display read signal and said display line data transfer signal are generated as a pair based on said memory write clock and outputted to said memory circuit, and at the time of writing of display data in said memory circuit, the latest updated data is always re-transferred to said line latch circuit.

3. An image display control method, comprising:
   reading display data written in a memory circuit in the units of lines;
   holding said display data read from said memory circuit in the units of lines in a line latch circuit;
   supplying said display data in the units of lines to an image display apparatus from said line latch circuit such that said image display apparatus accordingly displays an image;
   detecting an access contention for the same address in said memory circuit, which occurs between writing to update said display data and reading of said display data to display an image;
   in response to detection of said access contention, generating a display read signal and a display line data transfer signal for execution of same line re-display read processing; and supplying said display read signal and said display line data transfer signal to said memory circuit while supplying said display line data transfer signal to said line latch circuit which holds, in the units of lines, data which has been read out from said memory circuit, whereby the line for which said access contention has occurred is re-displayed.

4. The image display control method of claim 3, wherein the same line is re-displayed speedily as a contention occurs, and therefore, without displaying wrong data because of the access contention, the latest data held in said memory circuit is re-transferred to said line latch circuit and the latest data as it is after the contention has been resolved is displayed.

5. The image display control method of claim 4, wherein the same line is re-displayed for any set number of times.

6. The image display control method of claim 4, wherein the same line is re-displayed so that the phase relationship is forced to shift between the cycles of display data transfer to said memory circuit and the cycles of a display read access to said memory circuit and the frequency of later access contentions for the same address is accordingly reduced.

7. An image display control apparatus, comprising:
a host computer;
a host interface circuit which transfers display data with said host computer;
a memory address counter circuit which receives a write address from said host interface circuit and increments or decrements the address;
a register setting circuit which receives a register write address and register write data from said host interface circuit;
a display read clock signal generating circuit which generates a display read clock signal which serves as a reference clock for displaying;
a horizontal-direction counter circuit for display which counts said display read clock signal which is outputted from said display read clock signal generating circuit;
a horizontal-counter decode circuit which decodes an output signal of said horizontal-direction counter circuit for display and outputs a first display read signal and a first display line data transfer signal;
a vertical-direction counter circuit for display which receives a predetermined output value of said horizontal-direction counter circuit for display and increments or decrements;
a counter decode circuit which decodes an output from said vertical-direction counter circuit for display and an output from said memory address counter circuit and outputs a memory write address and a display read address;
an address coincidence detect circuit which receives said memory write address and said display read address which are outputted from said counter decode circuit and determines whether said memory write address and said display read address coincide with each other;
an access contention monitoring period pulse generating circuit which generates a pulse which defines an access contention monitoring period, based on the outputs from said horizontal-counter decode circuit;
an address contention judging circuit which determines whether there is a contention between said display read address and said memory write address in accordance with an output from said address coincidence detect circuit and an output from said access contention monitoring period pulse generating circuit;
a host retry pulse generating circuit which receives said memory write clock from said host interface circuit and an output from said address contention judging circuit, and during said access contention monitoring period, as an access contention arises, generates a second display read signal and a second display line data transfer signal based on said memory write clock;
a normal read processing circuit which generates a third display read signal and a third display line data transfer signal which are for execution of normal display read processing, in accordance with said first display read signal and said first display line data transfer signal outputted from said horizontal-counter decode circuit and the output from said vertical-direction counter circuit for display;
a retry display read selection circuit which selectively outputs, in accordance with an output from said register setting circuit, either one of said second display read signal outputted from said host retry pulse generating circuit and said third display read signal outputted from said normal read processing circuit
a retry line data transfer selection circuit which selectively outputs, in accordance with an output from said register setting circuit, either one of said second display line data transfer signal outputted from said host retry pulse generating circuit and said third display line data transfer signal outputted from said normal read processing circuit
a memory circuit which receives an output from said host interface circuit, an output from said memory address counter circuit, an output from said vertical-direction counter circuit for display, an output from said retry display read selection circuit and an output from said retry line data transfer selection circuit, and stores display data which a image display apparatus is to display; and
a line latch circuit which receives an output from said memory circuit and the output from said retry line data transfer selection circuit, holds the output from said memory circuit in the units of lines, and supplies an output to said image display apparatus.

8. The image display control apparatus of claim 7, wherein at the time that a contention is judged based on the output from said address contention judging circuit, said host retry pulse generating circuit generates said second display read signal and said second display line data transfer signal as a pair for every contention and outputs these to said memory circuit, so that the latest updated data is always re-transferred to said line latch circuit during writing of display data in said memory circuit.

9. An image display control apparatus, comprising:
a host computer;
a host interface circuit which transfers display data with said host computer;
a memory address counter circuit which receives a write address from said host interface circuit and increments or decrements the address;
a register setting circuit which receives a register write address and register write data from said host interface circuit;
a display read clock signal generating circuit which generates a display read clock signal which serves as a reference clock for displaying;
a horizontal-direction counter circuit for display which counts said display read clock signal which is outputted from said display read clock signal generating circuit;
a horizontal-counter decode circuit which decodes an output signal of said horizontal-direction counter circuit for display and outputs a first display read signal and a first display line data transfer signal;

a vertical-direction counter circuit for display which receives a predetermined output value of said horizontal-direction counter circuit for display and increments or decrements;

a counter decode circuit which decodes an output from said vertical-direction counter circuit for display and an output from said memory address counter circuit and outputs a memory write address and a display read address;

an address coincidence detect circuit which receives said memory write address and said display read address which are outputted from said counter decode circuit and determines whether said memory write address and said display read address coincide with each other;

an access contention monitoring period pulse generating circuit which generates a pulse which defines an access contention monitoring period, based on the outputs from said horizontal-counter decode circuit;

an address contention judging circuit which determines whether there is a contention between said display read address and said memory write address in accordance with an output from said address coincidence detect circuit and an output from said access contention monitoring period pulse generating circuit;

a same line re-display read processing circuit which receives said first display read signal and said first display line data transfer signal outputted from said horizontal-counter decode circuit and an output from said address contention judging circuit, and generates a second display read signal and a second display line data transfer signal which are for execution of same line re-display read processing, without moving to the next line as a contention arises during said access contention monitoring period;

a normal read processing circuit which generates a third display read signal and a third display line data transfer signal which are for execution of normal display read processing, in accordance with said first display read signal and said first display line data transfer signal outputted from said horizontal-counter decode circuit and the output from said vertical-direction counter circuit for display;

a retry display read selection circuit which selectively outputs, in accordance with an output from said register setting circuit, either one of said second display read signal outputted from said same line re-display read processing circuit and said third display read signal outputted from said normal read processing circuit;

a retry line data transfer selection circuit which selectively outputs, in accordance with an output from said register setting circuit, either one of said second display line data transfer signal outputted from said same line re-display read processing circuit and said third display line data transfer signal outputted from said normal read processing circuit;

a memory circuit which receives an output from said host interface circuit, an output from said memory address counter circuit, an output from said vertical-direction counter circuit for display, an output from said retry display read selection circuit and an output from said retry line data transfer selection circuit, and stores display data which a image display apparatus is to display; and a line latch circuit which receives an output from said memory circuit and the output from said retry line data transfer selection circuit, holds the output from said memory circuit in the units of lines, and supplies an output to said image display apparatus.

10. The image display control apparatus of claim 9, wherein at the time that a contention is judged based on the output from said address contention judging circuit, said same line re-display read processing circuit speedily performs re-display processing of the same line, and therefore, without displaying wrong data because of the access contention, the latest data held in said memory circuit is re-transferred to said line latch circuit and the latest data as it is after the contention has been resolved is displayed.

11. The image display control apparatus of claim 10, wherein said same line re-display read processing circuit comprises means which freely sets the number of times for which re-display processing is executed on the same line.

12. An image display control apparatus, comprising:
a host computer;
a host interface circuit which transfers display data with said host computer;
a memory address counter circuit which receives a write address from said host interface circuit and increments or decrements the address;
a register setting circuit which receives a register write address and register write data from said host interface circuit;
a display read clock signal generating circuit which generates a display read clock signal which serves as a reference clock for displaying;
a horizontal-direction counter circuit for display which counts said display read clock signal which is outputted from said display read clock signal generating circuit;
a horizontal-counter decode circuit which decodes an output signal of said horizontal-direction counter circuit for display and outputs a first display read signal and a first display line data transfer signal;
a vertical-direction counter circuit for display which receives a predetermined output value of said horizontal-direction counter circuit for display and increments or decrements;
a counter decode circuit which decodes an output from said vertical-direction counter circuit for display and an output from said memory address counter circuit and outputs a memory write address and a display read address;
an address coincidence detect circuit which receives said memory write address and said display read address which are outputted from said counter decode circuit and determines whether said memory write address and said display read address coincide with each other;
an access contention monitoring period pulse generating circuit which generates a pulse which defines an access contention monitoring period, based on the outputs from said horizontal-counter decode circuit;
an address contention judging circuit which determines whether there is a contention between said display read address and said memory write address in accordance with an output from said address coincidence detect circuit and an output from said access contention monitoring period pulse generating circuit;
a host retry pulse generating circuit which receives said memory write clock from said host interface circuit and an output from said address contention judging circuit, and during said access contention monitoring period, as an access contention arises, generates a second display read signal and a second display line data transfer signal based on said memory write clock;

a same line re-display read processing circuit which receives said first display read signal and said first display line data transfer signal outputted from said horizontal-counter decode circuit and an output from said address contention judging circuit, and generates a third display read signal and a third display line data transfer signal which are for execution of same line re-display read processing, without moving to the next line as a contention arises during said access contention monitoring period;

a normal read processing circuit which generates a fourth display read signal and a fourth display line data transfer signal which are for execution of normal display read processing, in accordance with said first display read signal and said first display line data transfer signal outputted from said horizontal-counter decode circuit and the output from said vertical-direction counter circuit for display;

a display read selection circuit which selects, in accordance with an output from said register setting circuit, either a state that of said second display read signal outputted from said host retry pulse generating circuit and said third display read signal outputted from said same line re-display read processing circuit, only said second display read signal outputted from said host retry pulse generating circuit is outputted, a state that said third display read signal outputted from said same line re-display read processing circuit alone out of these is outputted, or a state that both said second display read signal outputted from said host retry pulse generating circuit and said third display read signal outputted from said same line re-display read processing circuit are made valid and outputted, and which outputs this as a fifth display read signal;

a line data transfer selection circuit which selects, in accordance with an output from said register setting circuit, either a state that of said second display line data transfer signal outputted from said host retry pulse generating circuit and said third display line data transfer signal outputted from said same line re-display read processing circuit, only said second display line data transfer signal outputted from said host retry pulse generating circuit is outputted, a state that said third display line data transfer signal outputted from said same line re-display read processing circuit alone out of these is outputted, or a state that both said second display line data transfer signal outputted from said host retry pulse generating circuit and said third display line data transfer signal outputted from said same line re-display read processing circuit are made valid and outputted, and which outputs this as a fifth display line data transfer signal;

a retry display read selection circuit which selectively outputs either one of said fifth display read signal outputted from said display read selection circuit and said fourth display read signal outputted from said normal read processing circuit, in accordance with an output from said register setting circuit;

a retry line data transfer selection circuit which selectively outputs, in accordance with an output from said register setting circuit, either one of said fifth display line data transfer signal outputted from said line data transfer selection circuit and said fourth display line data transfer signal outputted from said normal read processing circuit;

a memory circuit which receives an output from said host interface circuit, an output from said memory address counter circuit, an output from said vertical-direction counter circuit for display, an output from said retry display read selection circuit and an output from said retry line data transfer selection circuit, and stores display data which a image display apparatus is to display; and a line latch circuit which receives an output from said memory circuit and the output from said retry line data transfer selection circuit, holds the output from said memory circuit in the units of lines, and supplies an output to said image display apparatus.

13. The image display control apparatus of claim 12, wherein at the time that a contention is judged based on the output from said address contention judging circuit, said host retry pulse generating circuit generates said second display read signal and said second display line data transfer signal as a pair for every contention and outputs these to said memory circuit, so that the latest updated data is always re-transferred to said line latch circuit during writing of display data in said memory circuit.

14. The image display control apparatus of claim 12, wherein at the time that a contention is judged based on the output from said address contention judging circuit, said same line re-display read processing circuit speedily performs re-display processing of the same line, and therefore, without displaying wrong data because of the access contention, the latest data held in said memory circuit is re-transferred to said line latch circuit and the latest data as it is after the contention has been resolved is displayed.

15. The image display control apparatus of claim 14, wherein said same line re-display read processing circuit comprises means which freely sets the number of times for which re-display processing is executed on the same line.

16. The image display control method of claim 14, wherein said same line re-display read processing circuit performs re-display processing of the same line so that the phase relationship is forced to shift between the cycles of display data transfer from said host computer to said memory circuit and the cycles of a display read access to said memory circuit and the frequency of later access contentions for the same address is accordingly reduced.

17. The image display control method of claim 12, wherein at the time that a contention is judged based on the output from said address contention judging circuit, said host retry pulse generating circuit generates said second display read signal and said second display line data transfer signal as a pair for every contention and outputs these to said memory circuit, so that the latest updated data is always re-transferred to said line latch circuit during writing of display data in said memory circuit, and at the time that a contention is judged based on the output from said address contention judging circuit, said same line re-display read processing circuit speedily performs re-display processing of the same line, and therefore, without displaying wrong data because of the access contention, the latest data held in said memory circuit is re-transferred to said line latch circuit and the latest data as it is after the contention has been resolved is displayed.

* * * * *